United States Patent
Saigh et al.

(10) Patent No.: US 8,665,089 B2
(45) Date of Patent: Mar. 4, 2014

(54) PERSONAL SAFETY MOBILE NOTIFICATION SYSTEM

(75) Inventors: Michael Saigh, St. Louis, MO (US); Kevin R. Arndt, Summit Hill, PA (US)

(73) Assignee: Saigh and Son, LLC, St. Louis, MO (US)

(*) Notice: Subject to any disclaimer, the term of this patent is extended or adjusted under 35 U.S.C. 154(b) by 483 days.

(21) Appl. No.: 13/022,066

(22) Filed: Feb. 7, 2011

(65) Prior Publication Data
US 2011/0130112 A1 Jun. 2, 2011

Related U.S. Application Data

(63) Continuation-in-part of application No. 12/011,577, filed on Jan. 28, 2008, now Pat. No. 8,013,734.

(60) Provisional application No. 61/302,725, filed on Feb. 9, 2010.

(51) Int. Cl.
*G08B 1/08* (2006.01)

(52) U.S. Cl.
USPC ............ 340/539.13; 340/539.1; 340/539.11; 340/541; 340/573.1; 340/825.49; 455/404.1; 455/521

(58) Field of Classification Search
USPC ............... 340/539.13, 539.1, 539.11, 539.23, 340/541, 573.1, 825.49, 825.69; 455/404.1, 455/521, 456, 456.1, 456.2, 456.3
See application file for complete search history.

(56) References Cited

U.S. PATENT DOCUMENTS

| | | | |
|---|---|---|---|
| 5,929,777 A | 7/1999 | Reynolds | |
| 7,259,694 B2 | 8/2007 | Myllymaki et al. | |
| 7,308,246 B2 | 12/2007 | Yamazaki et al. | |
| 7,315,735 B2 * | 1/2008 | Graham | 455/404.1 |
| 7,355,507 B2 | 4/2008 | Binning | |
| 7,409,428 B1 | 8/2008 | Brabec et al. | |
| 2003/0050039 A1 * | 3/2003 | Baba et al. | 455/404 |
| 2007/0072581 A1 * | 3/2007 | Aerrabotu | 455/404.1 |
| 2008/0070546 A1 * | 3/2008 | Lee | 455/404.2 |

* cited by examiner

*Primary Examiner* — Hung T. Nguyen

(57) ABSTRACT

Described embodiments provide a system for alerting emergency responders to the existence of an emergency situation. The system includes multiple mobile devices in communication with a mobile communications network. Each mobile device includes an encapsulator for capturing encapsulation data from one or more data sensors of the mobile device. Each mobile device can be placed into an alert mode by a user of the mobile device. An emergency database in communication with the mobile communications network and one or more emergency response dispatchers receives, from one or more mobile devices in the alert mode, the encapsulation data, in substantially real-time. The emergency database sends an emergency alert notification to one or more alert groups associated with the users of each mobile devices in alert mode. Each mobile device sends an emergency alert notification to one or more additional mobile devices in a predetermined physical proximity to the mobile device.

20 Claims, 6 Drawing Sheets

PERSONAL SAFETY MOBILE NOTIFICATION SYSTEM

CROSS-REFERENCE TO RELATED APPLICATIONS

This application claims the benefit of the filing date of U.S. provisional application No. 61/302,725 filed Feb. 9, 2010, the teachings of which are incorporated herein in their entireties by reference.

This application is a continuation-in-part, and claims the benefit of the filing date, of U.S. patent application Ser. No. 12/011,577 filed Jan. 28, 2008, —U.S. Pat. No. 8,013,734—, the teachings of which are incorporated herein in their entireties by reference.

BACKGROUND OF THE INVENTION

1. Field of the Invention

The present invention relates to an emergency notification system and, specifically, a personal safety mobile notification system.

2. Description of the Related Art

A typical cellular or mobile phone system divides a geographic area into one or more "cells" with corresponding cellular towers. User devices (wireless mobile phones, computers, security systems, etc.) that are in a cell are in communication with one or more of the cellular towers responsible for the cell. Each cellular tower typically has a corresponding base station containing a power source and communication equipment in communication with a main communication system of the cellular phone system through a Mobile Telephone Switching Office (MTSO) or Mobile Switching Center (MSC). The phrase "public land mobile network (PLMN)" will be used to represent the entire mobile device communication network, regardless of the type of technology used in the communication network (e.g., GSM, PCS, CDMA, UMTS, etc). The PLMN might typically control any base station with which it is in communication, and might handle connections from cellular tower to cellular tower and from a cellular tower to the normal land-based phone system. While the term "cell" or "cellular" is used herein to refer to certain type of mobile device communication protocols, this term is used in its broadest sense to include other communications systems such as personal communications service ("PCS") protocol, and the Global System for Mobile communications ("GSM") protocol, or other similar communications protocols.

A cellular phone switches cells, and, thus, towers, as the phone is moved between geographic areas, allowing constant communication with the PLMN. Typically, a cellular phone has one or more codes associated with it, used to identify the specific phone, the phone's owner and the phone's service provider. For example, a cellular phone might have an Electronic Serial Number (ESN) or Mobile Equipment IDentifier (MEID) that is programmed into the phone when it is manufactured, a Mobile Identification Number (MIN) that is derived from the phone's number, and a System Identification Code (SID) that is assigned to each carrier by the Federal Communication Commissioner (FCC). While the ESN or MEID are considered a permanent part of the phone, both the MIN and SID codes are programmed into the phone when the cell phone is activated by a carrier. Additionally, many cellular phones include a Subscriber Identity Module (SIM) memory card. A SIM card is a removable card that stores a service-subscriber key (IMSI) used by a carrier to identify a subscriber.

When a cell phone is first activated, it transmits a signal seeking the nearest cellular tower/base station, for example, to transmit a registration request, so that the PLMN can track the cell phone's approximate geographic location in a database. Even when the cell phone is not activated, the cell phone is in communication with the tower/base station over one or more control channels. In this regard, the PLMN can obtain approximately real-time data representing the approximate location of the cell phone. The PLMN's tracking of the cell phone's geographic location is used mainly to compute which cell phone tower is nearest the cell phone as the cell phone moves, so as to allow for more efficient communication switching when the phone is mobile. Thus, for example, when the PLMN receives an incoming communication for a particular cell phone, the PLMN locates the particular cell phone in its database, locates the nearest cellular tower, and forwards the incoming communication to the nearest cellular tower to complete the communication path. Many cell phones also employ the control channel(s) for the transmission of Short Message Service (SMS) messages between a source cell phone and the tower/base station. Once an SMS message is created and sent from the cell phone, the message is sent to the PLMN, which then routes the message to the cellular telephone network through an SMS gateway. The message travels to a short message service center (SMSC), which then transmits the message to the cell phone tower nearest to a destination cell phone, and the tower then relays the message to the destination cell phone.

Current mobile technology schemes for warning the general public of an emergency situation, for example a terrorist act, crime, fire, natural disaster, or any other category of potentially or actually harmful event have numerous inherent disadvantages. For example, broadcast messaging (like SMS messaging), are a passive technology that do not allow subscribers to actively interact, interface, trigger or activate a location's alarm or siren network within a proximity of the emergency. Additionally, current mobile technology schemes do not allow for "real time" forensic information to be electronically collected, stored or transferred to emergency personnel and/or other organizations in order to help prevent further injury or to gather information about the emergency.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a system for alerting emergency responders to the existence of an emergency situation. The system includes multiple mobile devices in communication with a mobile communications network. Each mobile device includes an encapsulator for capturing encapsulation data from one or more data sensors of the mobile device. Each mobile device can be placed into an alert mode by a user of the mobile device. An emergency database in communication with the mobile communications network and one or more emergency response dispatchers receives, from one or more mobile devices in the alert mode, the encapsulation data, in substantially real-time. The emergency database sends an emergency alert notification to one or more alert groups associated with the users of each mobile devices in alert mode. Each mobile device sends an emergency alert notification to one or more additional mobile devices in a predetermined physical proximity to the mobile device.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
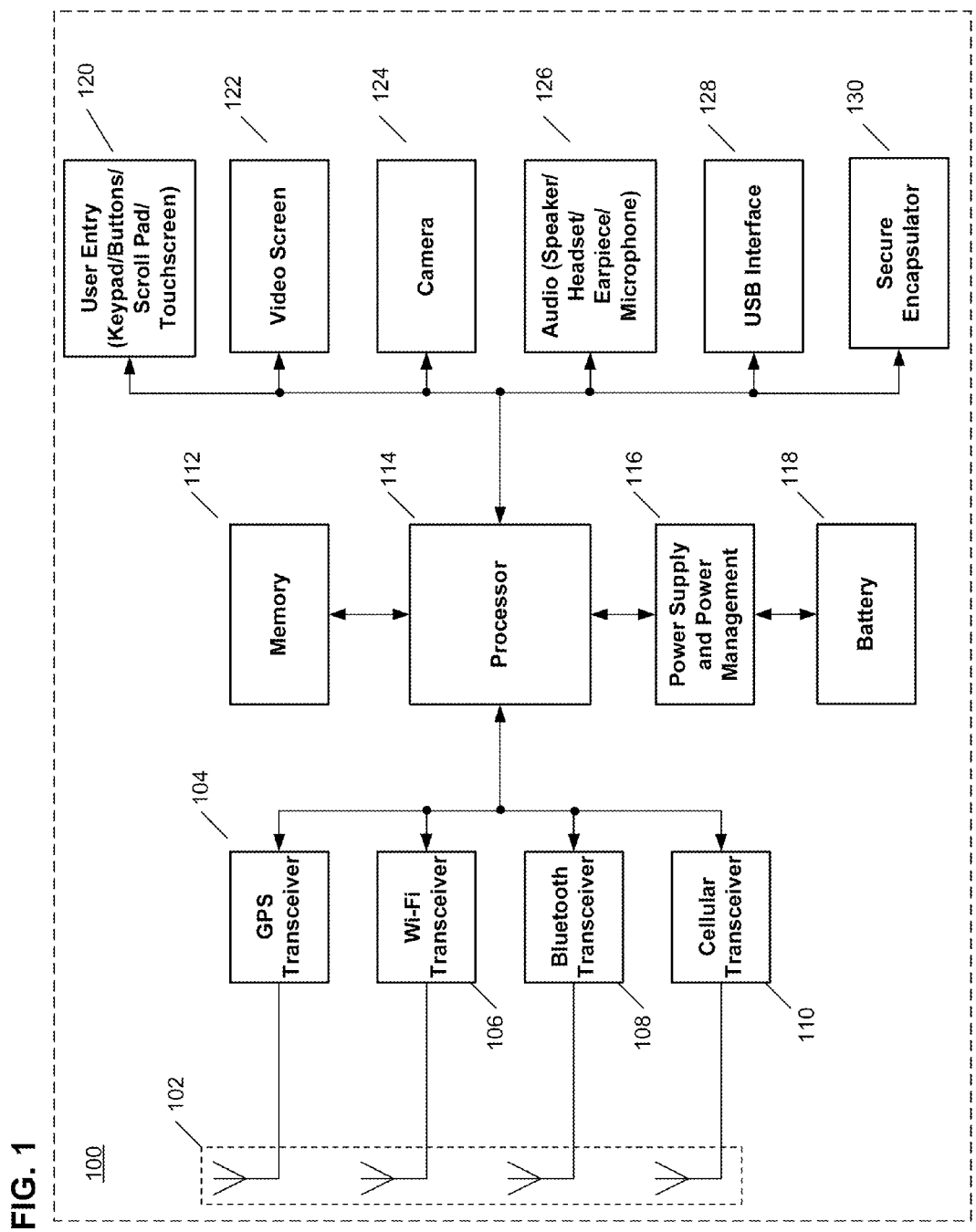
FIG. 1 shows a block diagram of a mobile device having a secure encapsulator, in accordance with embodiments of the present invention.

The terminology "black box" is commonly used to refer to a flight data recorder (FDR) or a cockpit voice recorder (CVR) that record aircraft data that can be recovered when an aircraft accident occurs. As will be described herein, embodiments of the present invention provide for encapsulators in cellular and mobile devices. An encapsulator might be thought of as a "black box" for recording, storing and streaming evidentiary information capturing a crime to law enforcement authorities.

Table 1 defines a list of acronyms employed throughout this specification as an aid to understanding the described embodiments of the present invention:

operating in accordance with one or more of the 802.11 communication standards. Mobile device 100 includes Bluetooth transceiver 108 for communication with wireless peripheral devices, for example, devices operating in accordance with the 802.15 communication standard. Cellular transceiver 110 is for communication with Public Land Mobile Network (PLMN), for example, in accordance with one or more mobile communications standards such as UMTS, PCS, GSM, 3G, 4G, or others. As indicated by the dashed line, one or more of transceivers 104, 106, 108 and 110 might share one or more common antennas 102.

Mobile device 100 might include one or more microcontrollers or digital signal processors (DSPs), shown collectively in FIG. 1 as processor 114. Processor 114 might typically include at least a portion of an operating system of mobile device 100, perform signal processing for signals received from or transmitted to transceivers 104, 106, 108 and 110, and generally control operation of other modules of mobile device 100. Processor 114 interfaces with memory 112, which might include one or more memories for storage of, for example, the operating system of mobile device 100, software applications installed on mobile device 100, various user data such as contact information, calendar information, text messages, email messages, photographs, videos, or other electronic files. Memory 112 might be internal to the hardware of mobile device 100, might be on a memory card, such as a micro Secure Digital (SD) card, inserted into mobile device 100, or some combination thereof.

Mobile device 100 is powered by battery 118 via power supply and power manager 116, which might typically provide required operating voltages of mobile device 100 and manage recharging of battery 118. User entry 120, which might include a touch screen input, keypad, buttons, scroll wheel, touch pad, voice commands, or other input to mobile device 100. Mobile device 100 displays output data on video screen 122, and provides output audio data to and receives audio input data from audio input and output 126. Mobile device 100 might typically include camera 124 for taking still photos and/or videos. Universal Serial Bus (USB) interface 128 might allow mobile device 100 to be plugged in to various USB devices, such as a computer. In accordance with

TABLE 1

| MTSO | Mobile Telephone Switching Office | MSC | Mobile Switching Center |
|---|---|---|---|
| PLMN | Public Land Mobile Network | UMTS | Universal Mobile Telecommunications System |
| GSM | Global System for Mobile Communications | PCS | Personal Communications Service |
| CDMA | Code Division Multiple Access | WCDMA | Wideband Code Division Multiple Access |
| TDMA | Time Division Multiple Access | GPS | Global Positioning System |
| SMS | Short Message Service | SMSC | Short Message Service Center |
| SIM | Subscriber Identification Module | SID | System Identification Code |
| MIN | Mobile Identification Number | ESN | Electronic Serial Number |
| MEID | Mobile Equipment IDentifier | IMSI | International Mobile Subscriber Identity |
| CVR | Cockpit Voice Recorder | FDR | Flight Data Recorder |
| USB | Universal Serial Bus | SD | Secure Digital |
| PDA | Personal Digital Assistant | DSP | Digital Signal Processor |
| CBMD | Cellular Based Motion Detector | PI | Push Initiator |

FIG. 1 shows a block diagram of mobile device 100 including secure encapsulator 130. Mobile device 100 might be a cellular telephone, PDA, or other mobile communications device. As shown, mobile device 100 includes GPS transceiver 104 for communication with the satellite-based global positioning system, wi-fi transceiver 106 for communication with a wireless network, for example, a wireless network embodiments of the present invention, mobile device 100 also includes secure encapsulator 130.

Secure encapsulator 130 might include a tamper-resistant and encrypted memory device. The memory device might be implemented to withstand extreme conditions, such as, but not limited to, high and low temperatures, impact, electrical surges, water and other conditions in order to maintain integrity of the information stored in encapsulator 130. The data stored in secure encapsulator 130 might later be accessed by police or other law enforcement organizations. In some embodiments, secure encapsulator 130 might be remotely accessed, in real-time or "after the fact", by authorized authorities. Encapsulator 130 might be secured utilizing encryption, passwords, or biological identifiers. The degree of encryption, decryption and deciphering might be adjusted through software options and/or hardware implementation.

Secure encapsulator 130 might, when activated, record at least some portion or all of sensor based data of mobile device 100. The sensor data might be sourced in any format, protocol and technology including, but not limited to, audio, video, thermal imaging, still images, biological data, GPS location data, cellular tower data, and the like. Secure encapsulator 130, when activated, might store such data leading up to, and during, the activation of an emergency alert mode of mobile device 100. Alternatively, secure encapsulator 130 might collect sensor data over a predefined period, where when the period is reached newer data overwrites newer data. In addition, secure encapsulator 130 might activate additional sensors, either local to mobile device 100, or remote to mobile device 100 through one or more of transceivers 104, 106, 108 and 110, to help record data pertaining to the emergency alert and enhance any sensors available on mobile device 100. Secure encapsulator 130 might typically, in order to save memory space, store data for a determined period of time, before erasing or overwriting the stored data. Thus, secure encapsulator 130 might be configured with a programmed time duration to track, or a programmed time duration to maintain the tracked data.

Figure 2:
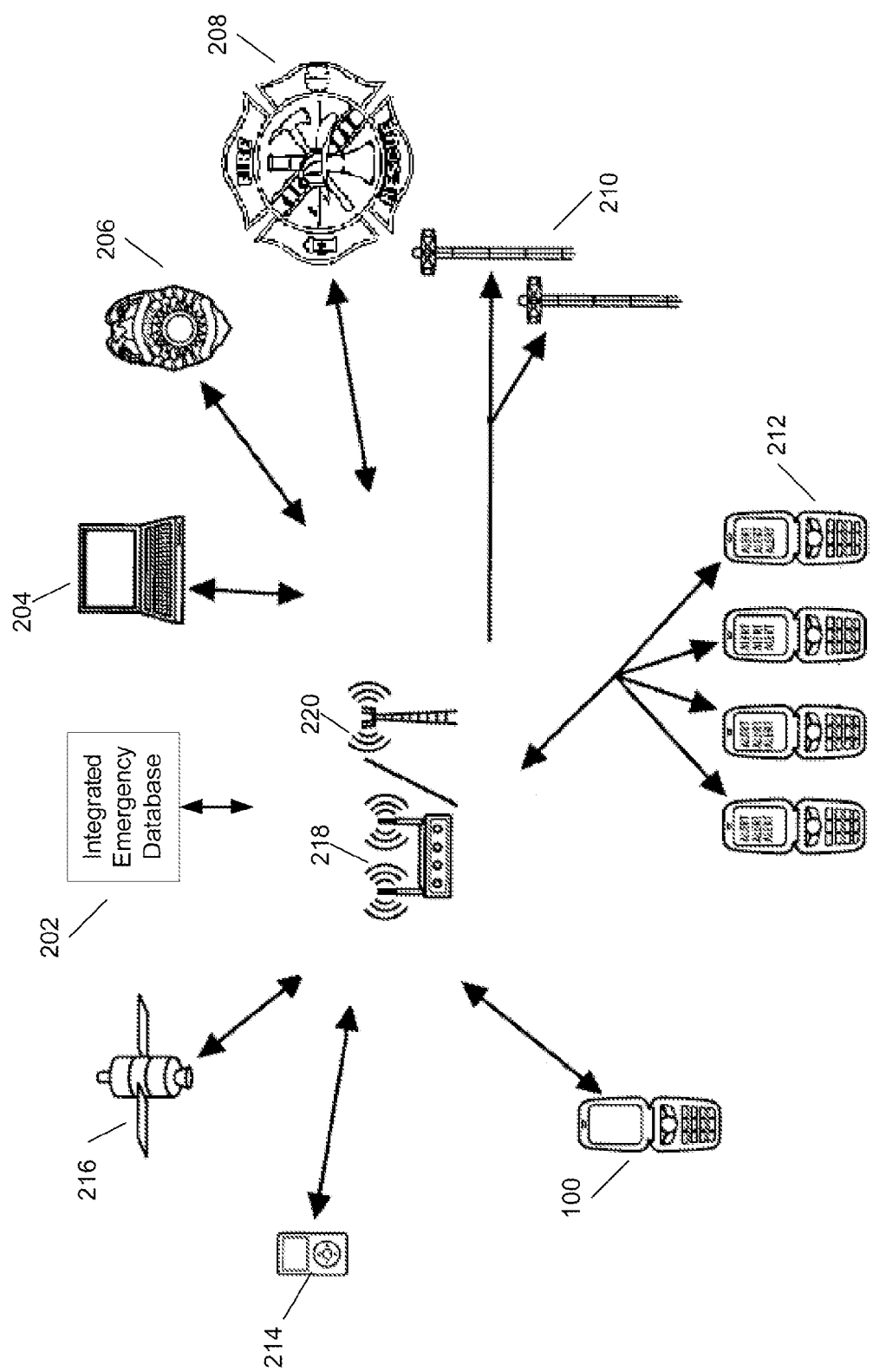
FIG. 2 shows a logical diagram of a system employing one or more of the mobile devices of FIG. 1 and an integrated emergency database, in accordance with embodiments of the present invention.

FIG. 2 shows a logical diagram of communications by mobile device 100 that might be initiated and managed by secure encapsulator 130. As shown in FIG. 2, secure encapsulator 130 might cause mobile device 100 to transfer recorded data via at least one of transceivers 104, 106, 108 and 110, to integrated emergency database 202, for example, via cellular tower 220 or wi-fi router 218. Integrated emergency database 202 might then initiate communication to one or more of law enforcement services 206, emergency services 208, one or more remote computers 204, and one or more other mobile devices 212 and portable electronics 214. The other mobile devices 212 might be within a given proximity of mobile device 100. Thus, mobile device 100 might transmit an electronic emergency alert signal if the user of mobile device 100 encounters an emergency situation or becomes incapacitated. Secure encapsulator 130 might enable tracking of the location of mobile device 100 through GPS system 216, such that other mobile devices in proximity to the alert might be notified of the emergency situation. Further, GPS system 216 might be employed to provide the user of mobile device 100, or mobile devices 212 in proximity to mobile device 100 based on the integrated emergency database, with information to escape from the emergency situation. Integrated emergency database 202 might track individuals, police units, members of a given class (e.g., corporate employees, family members, etc.).

Integrated emergency database 202 might provide to authorities, for example law enforcement services 206, data on an emergency or crime as it occurs. For example, secure encapsulator 130 might provide to law enforcement services 206, via integrated emergency database 202, information about the location and conditions of the emergency or crime, such as, for example GPS coordinates, thermal data, still or video image data, and audio data to provide law enforcement services 206 with possible physical identifiers of the emergency or crime. Further, mobile device 100 might trigger surveillance systems, for example of building security cameras or municipality traffic or security cameras near mobile device 100, to record additional data of the emergency or crime situation. Secure encapsulate 130 might further attempt to gather biological data on the user of mobile device 100. Integrated emergency database 202 might also send a signal to alarm systems and/or emergency claxons 210 within a given proximity of mobile device 100 to generate an audible warning of the emergency situation. Alarm systems and emergency claxons 210 might also include visible warnings, such as setting traffic signals or other warning signals within a given proximity of mobile device 100. For example, traffic signals might be set to direct citizens away from a dangerous emergency condition, or to facilitate arrival of emergency response personnel.

Embodiments of the present invention might beneficially be adapted for use with, for example, the U.S. Transportation Security Administration (TSA) and other special-purpose law enforcement agencies, to send an electronic emergency alert directly to a 911 call center and/or other predetermined government authorities. Integrated emergency database 202 might enable real-time bidirectional dispatch control of law enforcement and emergency responders. For example, integrated emergency database 202 might enable information from one or more mobile devices of citizens or other law enforcement personnel to affect dispatch of emergency response units. For example, data gathered by secure encapsulator 130 might be used to direct TSA agents responding to an emergency situation in an airport or other security officers in a university or business campus setting. For example, in an airport setting, integrated emergency database 202 might then provide a public notification to other mobile devices within the airport, activate audible or visual alerts in the area of the emergency, and activate security cameras of the airport within line of sight of mobile device 100. Integrated emergency database 202 might dispatch local response units or request additional responders from one or more law enforcement of emergency response organizations. Integrated emergency database 202 might also allow authorized individuals or law enforcement authorities to browse historical archival data of one or more encapsulators.

Embodiments of encapsulator 130 might send, directly to law enforcement authorities, data from mobile device 100 to enable law enforcement agents to perform, for example, computer analysis of data provided by encapsulator 130, such as face recognition processing, location tracking or behavioral analysis. Law enforcement agents or emergency responders, for example, might then request encapsulator 130 to attempt to detect a heartbeat, perspiration or other biological data of the user to determine the health status of a user of mobile device 100. To protect user privacy, data might be sent directly to law enforcement authorities upon request of the user, for example by entering emergency alert mode of mobile device 100, and data might be sent directly to authorities without being stored at any location other than within secure encapsulator 130. Thus, embodiments of encapsulator 130 and integrated emergency database 202 might be beneficially employed by security agents of, for example, a university, corporate or government building or campus, airport security, police departments, and the like.

Embodiments of the present invention might employ cumulative alert verification. Cumulative alert notification might be implemented as an automated software application sent to a mobile device. A Push Initiator (PI) could, in one embodiment of the current invention, transmit Push content and delivery instructions to a mobile device, terminal, server or other computer device with specific instructions. According to embodiments of the current invention, Push data might, in real-time, be transferred from one mobile device 100 to another mobile device 100, or from one emergency database 202 to another emergency database 202. This data might be transferred by cellular, satellite, wireless, wired, internet, or any type or combination of data transfer. Thus, integrated emergency database 202 might collect synchronous and asynchronous information regarding a crime scene or emergency situation from one or more mobile devices or other sources. Integrated emergency database 202 might collect crime scene or emergency information, in real-time, from one or more additional mobile devices employing encapsulator 130 in a specific GPS coordinate range, for example, a given building on a campus, and transfer the information from the several sources to integrated emergency database 202. Cumulative alert notification might be employed to help law enforcement and other emergency responders to react to the emergency situation based on, for example, data gathered by the one or more mobile devices employing encapsulator 130 showing a severity of the emergency and a number of mobile devices, and so corresponding local people, within a given range of the emergency situation. Further, collecting data from multiple mobile devices might provide authorities important cumulative onsite witness collaboration information to verify a crime or other emergency situation. This cumulative verification might help emergency responders properly react to the criminal or emergency situation by directing responding personnel and equipment based on the severity and location of the emergency and the number of individuals within a given range of the emergency.

Integrated emergency database 202 might also allow law enforcement agencies or other emergency responders to inform other mobile devices in a given geographical region or specific location or building within a campus. Thus, a campus security force or a law enforcement agency might transmit an alert to one or more mobile devices in a given location to inform the public of an emergency situation, for example based on an emergency alert generated by mobile device 100. For example, an emergency dispatcher might receive numerous emergency alerts from mobile devices in one or more regions. Each region might have a corresponding emergency database to accumulate similar evidentiary information from mobile devices employing embodiments of encapsulator 130. The emergency database might process data input from the one or more mobile devices to determine whether to send alerts or other data to other mobile device users in the region, or a portion of the region. For example, the emergency database might send data such as locations of nearest building exits, travel directions to avoid an emergency, medical or lifesaving information for assisting wounded people, the location of a closest police station, fire station or hospital and other data.

As described, emergency database 202 might be programmed to analyze received from one or more mobile device encapsulators. Emergency database 202 might match images to determine dangerous crime areas, TSA airport criteria, public emergency notices or the like to help protect the public from crime and terrorism. Encryption and information availability of emergency database 202 might typically vary depending on the security clearance of its users and nature of a given emergency situation. Some embodiments of emergency database 202 might include a mobile information database to determine the nearest emergency response station, the nearest response team, or the location of multiple individual teams or responders. This data could automatically be updated and pushed to one or more authorized mobile devices, such as mobile devices assigned to authorized law enforcement officers. Further, users of a given mobile device might determine a list of authorized individuals to whom an emergency alert should be sent if the mobile device is entered into an emergency alert mode. These alerts might not be sent to the general public or law enforcement or emergency responders, rather notifying pre-selected personal contacts.

Embodiments of encapsulator 130 might access one or more detection devices that are external to mobile device 100, for example via cellular technology, Bluetooth, or other wired or wireless communications employed by mobile device 100 to access an accessory device. These accessories might provide additional information of the emergency event to be stored in secure encapsulator 130 or transmitted, in real-time, to various emergency responders as described herein.

Figure 3:
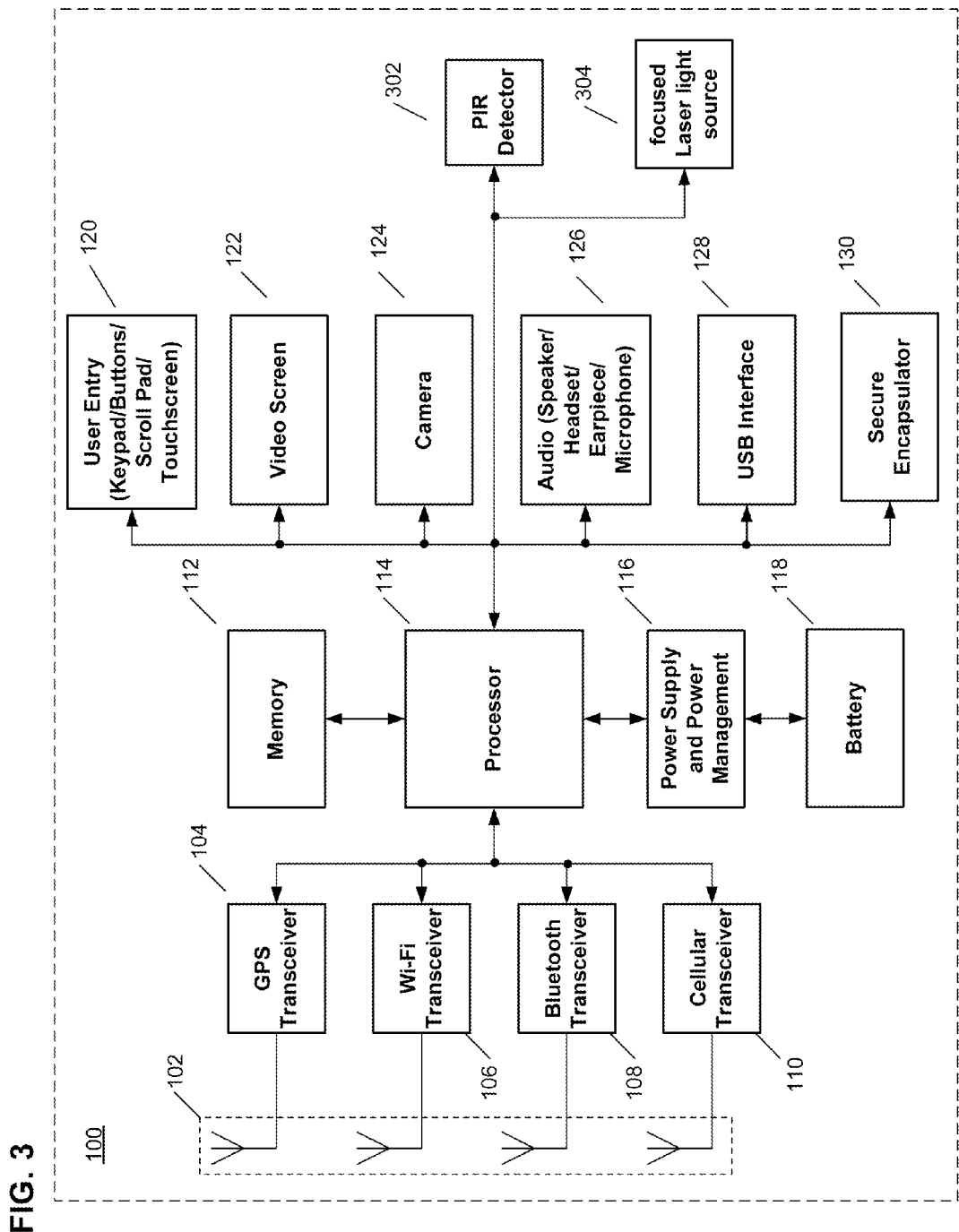
FIG. 3 shows a block diagram of a mobile device configured as a mobile security system, in accordance with embodiments of the present invention.

As shown in FIG. 3, some embodiments of mobile device 100 might include passive infrared (PIR) detector 302 to detect body heat of a user of mobile device 100. Further, embodiments of mobile device 100 might be employed as a Cellular Based Motion Detector (CBMD) to detect a "normal" level of body heat in a given room and detect additional levels of body heat when, for example, an intruder walks into a field of view of PIR detector 302 of mobile device 100. If a sharp increase of IR energy is detected, mobile device 100 might sound an audible alarm, or might generate an alert signal, for example by sending data gathered by encapsulator 130 to emergency authorities. Thus, embodiments of mobile device 100 adapted for use as a CBMD might be employed as a mobile security system that might be beneficially employed in, for example, a hotel room. Upon motion being detected by the CBMD, the hotel front desk or hotel security could be notified with an emergency alert signal. The CBMD might typically allow for heat energy fluctuations without triggering the CBMD, for example, by determining an average heat level in range of PIR detector 302. Further, upon being triggered, the CBMD might include a user-settable time delay between first sounding the motion alarm and making any automated calls to 911 or sending any other automated emergency alerts. In some embodiments of the present invention, one or more focused laser light sources 304 could be set between one or more protected paths from mobile device 100. For example, in a hotel room, a user might set a protected path for the hotel room window and the hotel room door to sound an alarm when an intruder enters the protected path. The CBMD could be employed in any type of indoor or outdoor space or automobiles.

As described herein, some embodiments of secure encapsulator 130 and integrated emergency database 202 might allow users of cellular networks and mobile devices the ability to program "alert notification units" to provide a group security alert to one or more subgroups within the larger group network. For example, within all cellular users within a given geographic region, a user might create one or more alert notification units that include, for example, family members, coworkers, friends, medical caregivers, or other individuals authorized by the user to receive alerts generated by secure encapsulator 130. Thus, for example, a family could set their mobile devices 100 having secure encapsulator 130 to track the location of each family member through GPS and allow interlocking family trace maps for all members of the family in the event of an emergency alert. The family could also set secure encapsulator 130 to provide other functionality as described herein of encapsulator 130 to each family member in the event of an emergency alert. Thus, for example, authorized members of an alert notification unit might be permitted access to each mobile device secure encapsulator within the alert notification unit. One or more users within the alert notification unit might be permitted access to data stored within secure encapsulator 130. Thus, for example, parents might enable tracing through GPS of the whereabouts of their children. In addition, a member of the alert notification unit, or an authorized emergency response organization might remotely activate or access one or more of the secure encapsulators of the mobile devices of the alert notification unit.

Further, mobile devices as part of an alert notification unit might be programmed to periodically signal an "ALL IS OK" or similar message to the authorized members of the alert notification unit. In described embodiments, if an authorized member of the alert notification unit does not receive the "ALL IS OK" signal from another member, the authorized member could remotely activate the alert mode of the mobile device of the other member. Thus, as described herein, the mobile device might then send an emergency alert to law enforcement or other emergency responders, and might activate data encapsulation or activate alarms of other nearby devices.

In some embodiments, a geographic "hotspot" might be defined based on a given geographic area near a mobile device in the alert mode. Law enforcement or authorized members of the alert notification unit, might receive a GPS map displaying the location of the hotspot to alert people of the location of an ongoing emergency situation. As the originating device moves the recipients could see the movement and, thus, the actual location of that device on their GPS map.

Some embodiments of the present invention, might allow for remote monitoring of biomedical attributes of people within range of mobile device 100 having secure encapsulator 130. For example, biomedical or other data might be transferred to integrated emergency database 202 for analysis, for example, to predict whether an emergency situation might occur. For example, a criminal suspect might exhibit nervousness, perspiration, fidgeting, or other medical symptoms.

Integrated emergency database 202 might provide users with a "crime history report" for a given geographic location. For example, a user might research a specific geographic area, building, street, address, etc. to determine a crime history for the selected location. For example, a user might request a crime history of a particular street address, for example, a particular convenience store. In addition, the crime history report might be provided to a user as part of a GPS map, to allow an individual user to adjust their travel or location based on the crime history data. For example, the crime history data map might allow individuals to determine the safest route for traveling to a given location, the safest streets or paths at a particular time of day, etc., so a user might bypass high crime areas. The crime history report might also include real-time updates of current emergency alerts, so that a user might bypass an ongoing emergency location.

Embodiments of the present invention provide of bi-directional alert transfers (between mobile device 100 and emergency responders via integrated emergency database 202) and tri-directional alert transfers (between mobile device 100 and (i) emergency responders via integrated emergency database 202 and (ii) directly to other mobile or security devices). Thus, emergency data might be transferred to other mobile devices.

In described embodiments of the present invention, an alert mode of mobile device 100 might be triggered by, for example, a mechanical trigger, an audible or visual trigger, and a sequence of one or more keys, motion detectors, velocity detectors and other means of quickly triggering the alert. Further, activation of the alert mode might be based on biomedical indicators that allow an alert mode to be triggered in a "stealth mode" such that it is not apparent to others, such as a robber or kidnapper, that an alert mode has been activated. For example, one or more biomedical sensors might be in communication with secure encapsulator 130. These biomedical sensors might include, for example, electrodes against the skin of the user, where the electrodes are in wireless communication with mobile device 100, for example via Bluetooth transceiver 108, radio frequency identification (RFID), or any other wireless communication. Thus, secure encapsulator 130 might also track one or more indicators of a user's biomedical condition, such as metabolism, heart rate or EKG, or hormones released from the user's suprarenal gland in conjunction with stress. A stress monitor along with other sensors capable of sensing a human's "danger stress" levels might be employed to automatically trigger an emergency alert by secure encapsulator 130. Controlled danger stress tests might be performed on each user such that an average "normal" level could be determined, such that secure encapsulator 130 only triggers when a measured stress level is above a relative threshold in comparison to the normal stress level. Stress releasing hormones such the synthesis of corticosteroids and catecholamines, including adrenaline and cortisol, could be measured and tracked by secure encapsulator, or employed by secure encapsulator 130 to trigger an emergency alert. Such an automated and stealth activation of an alert mode of mobile device 100 might be beneficial in situations where individuals don't have the time, capacity or opportunity to manually activate an alert mode. In some embodiments, integrated emergency database 202 might monitor stress levels of various users in a given set of users, and might detect peak stress levels and react with emergency help remotely.

Figure 4:
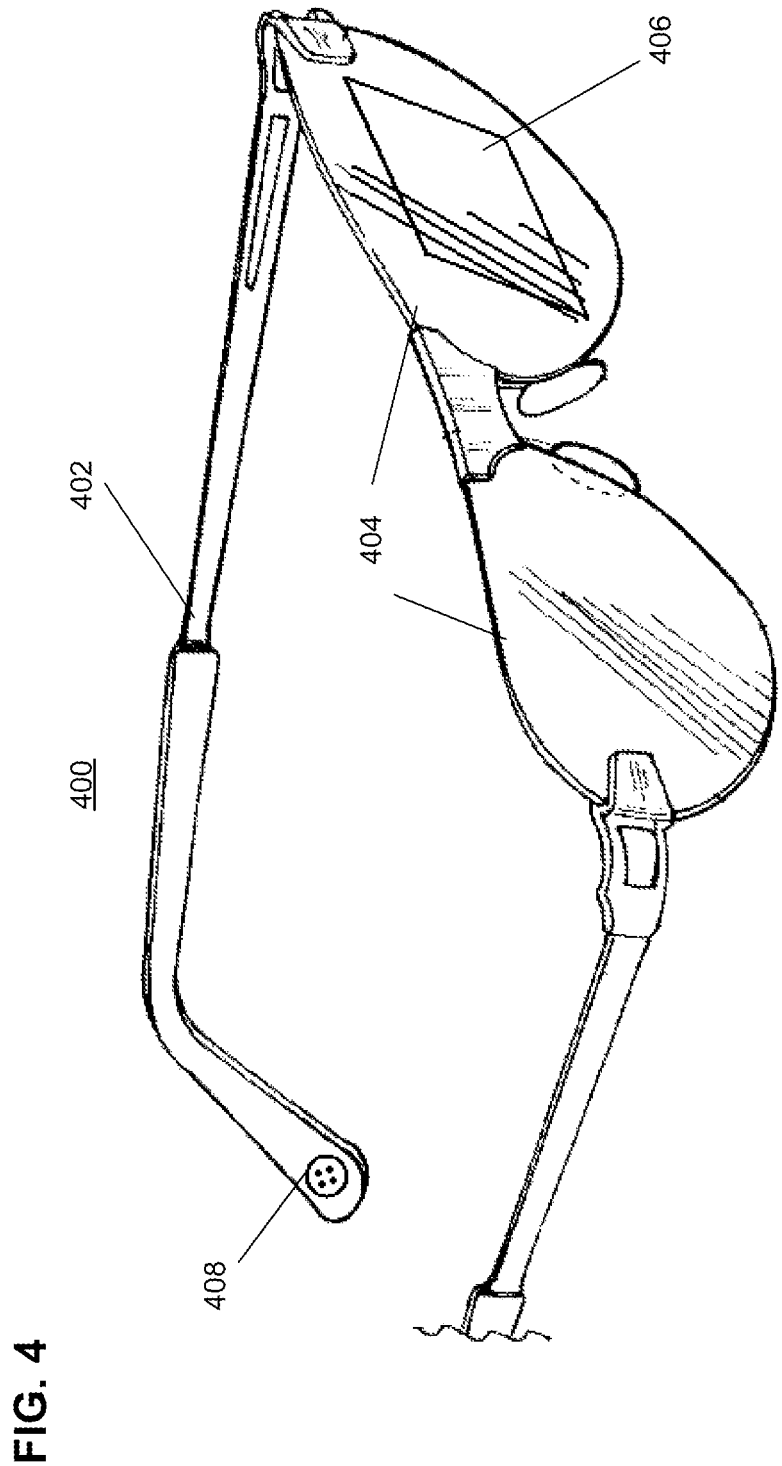
FIG. 4 shows a diagram of smart eyeglasses, in accordance with embodiments of the present invention.

Embodiments of the present invention might be in communication with one or more peripheral triggering devices that are in communication with mobile device 100 and secure encapsulator 130. These peripheral triggering devices might be employed by a user to covertly activate an alert mode of mobile device 100. For example, such peripheral triggering devices might include smart eyewear. Such smart eyewear might be contact lenses or glasses that display prompts visible only to the user wearing the eyewear. The smart eyewear might then allow the user to communicate an emergency situation with law enforcement or other emergency responders through, for example, eye movement or blinking. For example, as shown in FIG. 4, smart glasses 400 might include eyeglass frames 402 for holding lenses 404, where at least one of lenses 404 are adapted to display data from mobile device 100 in display area 406. Eyeglass frames 402 might contain at least one earpiece speaker 408. Eyeglass frames 402 might also contain a processor, memory, power supply, antenna and communication transceiver (not shown) for communication with mobile device 100. As described herein, the focal point of a user's pupil might act to move through menus or prompts displayed on lenses 402. Thus, smart glasses 400 might enable all functionality of mobile device 100, as well as activation of the alert mode. The display on lenses 402 is visible only from the users side of the lens, thus, usage will not be visible to individuals not wearing the smart glasses.

Figure 5:
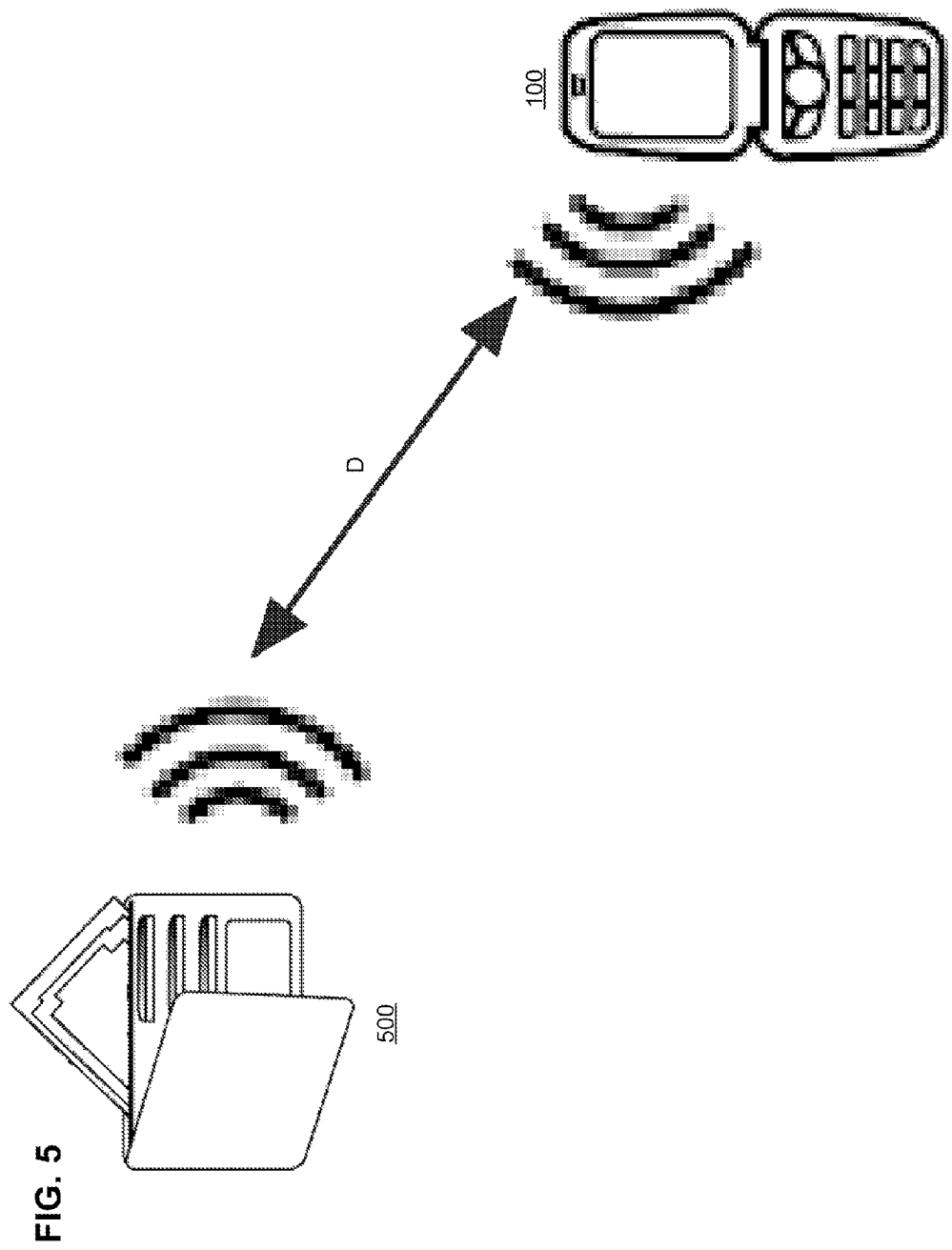
FIG. 5 shows a diagram of an alarm wallet, in accordance with embodiments of the present invention.

Similarly, other clothing accessories might be configured as peripheral triggering devices. For example, as shown in FIG. 5, such clothing accessories might include alarm wallet 500. Alarm wallet 500 might be in communication with mobile device 100, for example, by Bluetooth transceiver 108, radio frequency identification (RFID), or any other wireless communication. As indicated in FIG. 5, when alarm wallet 500 is removed from within a given range, D, of, for example, mobile device 100 or smart glasses 400, an alert might be triggered to mobile device 100 or smart glasses 400.

Configuration of alarm wallet 500 might be via a menu shown on mobile device 100 or smart glasses 400, and might include a selectable time delay to allow for regular use or accidental removal of alarm wallet 500 from within range of mobile device 100 or smart glasses 400.

Figure 6:
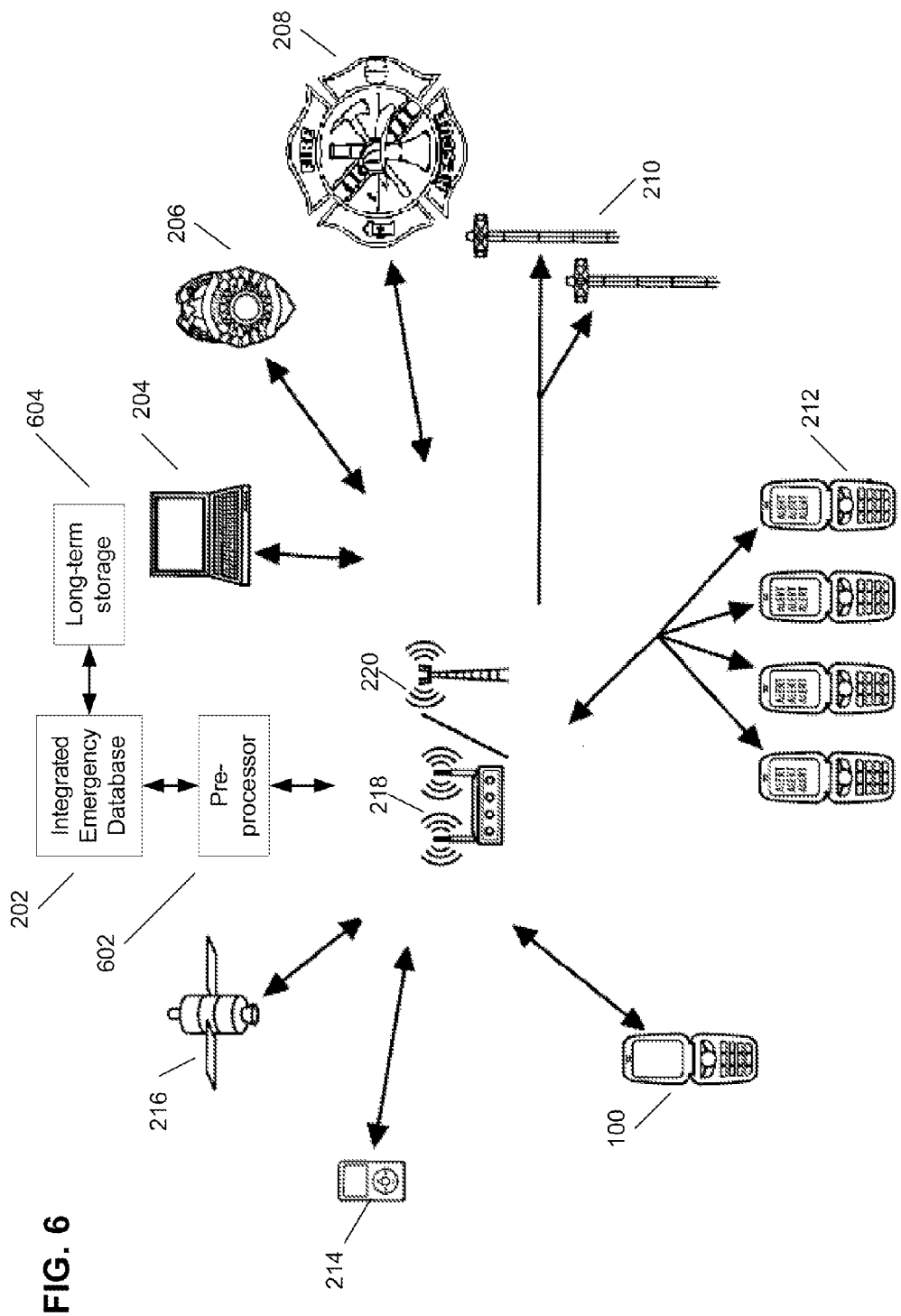
FIG. 6 shows a logical diagram of a system employing one or more of the mobile devices of FIG. 1 and an integrated emergency database with preprocessing, in accordance with embodiments of the present invention.

Further, embodiments of the present invention might reduce the burden to emergency responders, for example 911 call centers, by processing data received from one or more mobile devices. Similarly to FIG. 2, FIG. 6 shows a logical diagram of communications by mobile devices 212 that might be initiated and managed by a secure encapsulator. Specifically, the system shown in FIG. 6 includes pre-processor 602 to pre-process data from the one or more mobile devices 212 before the data is forwarded to integrated emergency database 202. Further, integrated emergency database 202 might store emergency data in one or more long-term storage servers 604.

Embodiments of pre-processor 602 might help reduce redundant alert data reporting the same emergency being transmitted to emergency responders. Pre-processor 602 might be employed to compare a multitude of "in the field" data inputs initiated by one or more mobile devices reporting an emergency alert. For example, similar emergency alerts and reports from a given geographic area might be compared to determine whether the alerts are reporting the same emergency situation or separate emergency situations. For example, for specific emergencies that occur in a specific geographic location reported by respective mobile device users, pre-processor 602 consolidates and organizes the reported data into one or more real-time reports provided to an emergency dispatcher, such that the dispatcher might receive a single report of a given emergency situation that is compiled using reported information from one or more mobile devices. Thus, pre-processor 602 might help enhance efficiency of emergency responders by reducing redundant alerts generated by one or more mobile device reports.

As described, pre-processor 602 might compile data reported from all "in the field" inputs in order to more fully develop a report of the emergency at hand to the emergency responders. Pre-processor 602 might analyze redundant or conflicting reports for a given emergency incident to more efficiently inform emergency responders. Pre-processor 602 might using statistical or graph methods for such analysis. For example, if pre-processor 602 receives 20 separate incident reports from 20 different user devices, graphing the physical GPS-identified locations might provide several types of information. For example, if reports are spread over several blocks of a city, even though the reports are within relative short distances of each other, two clusters of incident reports might be used to separate reporting of two different emergency events. In addition, a dense cluster of reports might be used to identify the most likely point of the emergency. For example, if 10 of the 20 reports are in the center of the area, it might be the closest or best point to send a responder, and ignore those reports that might be sent from users at a distance who happen to have a better visual vantage point (e.g., reporting users who are several floors up in a building but further away from the event. Analysis of clusters of reports also might allow pre-processor 602 to prevent a flood of reports from overwhelming either a server's processing or call center's response capacity.

Further, pre-processor 602 might compare all types of secure encapsulator inputs from each mobile device to evaluate the emergency situation and generate a consolidated report to emergency responders. For example, pre-processor 602 might compare like images to help ID a criminal suspect, a victim, a vehicle license plate, the extent of an emergency, etc. In addition, audio voice recognition could compare like audio recorded by the "in the field" user's device that could help police or other emergency personnel further clues of the situation in order to asynchronously or synchronously assist police or other emergency tasks forces. Pre-processor 602 might also compare GPS data, images, video and audio, and/or other useful information recorded at the scene of the emergency in order to generate a summary report or a comprehensive report to assist law enforcement agents or other emergency responders with identifying victims, witnesses, criminals or other evidentiary information that would solve the crime, lead to an arrest, or otherwise assist in their efforts. This information might be streamed in real time, and/or stored for future review in one or more databases.

As an example, pre-processor 602 might filter conflicting data from "in the field" alerts based on percentages of users that report one scenario versus others. For example, a report might show that 60% of users have reported only one accident, whereas 30% of users have reported two or more accidents, whereas another 10% reported a "hit and run" vehicle instigated the accident and 90% said the accident was caused by weather related conditions. Additionally, if a "in the field" cellular user reports the accident on a highway, pre-processor 602 might receive continually updated location information of the user (e.g., a stream of changing GPS longitude/latitude coordinates and then calculate the speed and the direction of the vehicle. With such information, embodiments of the present invention might be employed to assist the user in locating the next cross exit or closest exit to the accident.

Pre-processor 602 might edit, decipher, organize, analyze, and/or summarize this information and provide it to emergency responders in a single report. Further, pre-processor 602 and integrated emergency database 202 might integrate this emergency data with local, national or international data to help assist emergency responders by generating as complete a report of the emergency as possible. In addition, this information might be sent from the various sources to a central server, for example integrated emergency database 202, where the information is collected, analyzed and then forwarded to law enforcement in order to decrease the response time to the emergency site, help victims, prevent injury, or capture and arrest suspected perpetrators of the crime or emergency. In addition, the emergency data and information could be sent from a combination of one or more cellular "in the field" devices directly to law enforcement or utilize several information databases in order to assist law enforcement agencies or other emergency responders.

In the instance of a redundant report scenario, pre-processor 602 might send a prompt to the user asking if they are reporting a specific emergency. The message might include the location and nature of the incident. If the incident in the message is the one the user is reporting, the user could then press a button to affirm the report. If affirmed, a second message could, for example, appear telling the user that this emergency has already been reported and that the user's information has been recorded for use by law enforcement or other emergency responders. Pre-processor 602 might then send this information to the integrated emergency database 202 to be recorded for future investigation.

An example, the consolidated transmission could resemble the following hypothetical. It is understood by familiar in the art that the following is just an example of thousands of similar emergency situations.

Alert User Reporting: Accident: Geographical positioning:
Address and Map; Timestamp 11:05:43 AM CST
Hwy 40; Lindbergh Avenue, Clayton Rd. Ladue, Mo. 63124

{{{{{MAP (accident location icon)}}}}}}}
Computer Generated Dispatch Response:
Thank you for your emergency report:
We currently have emergency personnel on route of the accident at Hwy 40; Lindbergh Avenue, Clayton Rd. Ladue, Mo. 63124
{{{{{MAP (accident location icon)}}}}}}}
If you believe you are reporting a different emergency incident please Push help button immediately. [HELP]
If you can help emergency personnel with important information to help this emergency situation please Push the Assist button. [ASSIST]
Alert user response: [ASSIST]
Computer Generated Dispatch Response:
Reported Accident: Timestamp 11:05:43 AM CST
Hwy 40; Lindbergh Avenue, Clayton Rd. Ladue, Mo. 63124
{{{{{MAP (accident location icon)}}}}}}}
Did you Witness the Accident? [YES] [NO]
Alert user Response [YES]
Computer Generated Dispatch Response: Do you have Information Regarding the Accident that could be of Urgent ASSISTANCE? [YES] [NO]
Alert user Response [YES]
Computer Generated Dispatch Response: You are currently being connected to a live Dispatcher.
Alert user Response [NO], another automated menu might appear to request subsequent information.

In addition, pre-processor 602 might distinguish between an unresolved emergency with a help-in-progress or resolved emergency situation or any combination thereof. For example, emergency responders might have their location and status updated in real-time to integrated emergency database 202 to reflect the real-time status of the response.

In embodiments such as described above, the cellular device, when triggered, might trace the user through GPS. However, if the individual triggers the device from a distance when witnessing a crime or emergency or hotspot, the emergency dispatch unit will be called to the location of the person triggering the device based on the GPS information rather than where the crime is occurring. Thus, other embodiments of the present invention might utilize a feature that allows the individual to communicate the position of the emergency in lieu of a default GPS (or other) based location system. In one form, the user might be allowed to bring up a map on the handset screen, such as Google maps, that are keyed to the user location. A software application then would allow the user to touch the screen to identify the location on the map where the incident was observed, if the user has changed his location substantially from the point of the emergency event (e.g., in an attempt to escape the emergency). Upon touching the screen, the new GPS longitude/latitude coordinates of the event would be calculated and transmitted to, for example, pre-processor 602 described above.

A further exemplary feature might comprise circuitry added to existing handset technology. Emitter and sensor technology might be added to the handset to allow for measurement of direction and distance from the device to the actual location (hotspot) or the scene of the crime or emergency. This might be accomplished by the handset measuring such distance and direction, calculating the new GPS longitude/latitude coordinates of the event, and transmitting updated GPS coordinate information to, for example, pre-processor 602 described above. In this feature, the emergency dispatch unit can relocate the GPS to the proper location of the emergency (hotspot) rather than the location of the user reporting the incident. A spectral, audio, laser, sonar, or the like might be used for the emitter and sensor technology, for example, to allow the user to "point" to the scene of the crime or incident location. Emergency dispatch units will then go to where the calculated distance of the scene (hotspot) is located rather than to the device itself.

As described herein, some embodiments of the present invention might be implemented as a software application downloadable to a mobile device. The downloaded software application might work with existing hardware of the mobile device to implement an emergency notification alert system as described herein. For example, some embodiments might be available as an "app" or icon on the screen of the mobile device. Alternatively, some embodiments of the present invention might require special purpose hardware, and this might only be compatible with mobile devices having the emergency notification hardware.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of alerting emergency responders to the existence of an emergency situation, the method comprising:
    storing, by an encapsulator of a mobile device in communication with a mobile communications network, encapsulation data from one or more data sensors of the mobile device;
    activating, by a user of the mobile device, an alert mode of the mobile device;
    in the alert mode:
        sending, by the mobile device, the encapsulation data, in substantially real-time, to an emergency database in communication with the mobile communications network;
        sending, by the emergency database, a first emergency alert notification to one or more emergency alert groups associated with the user; and
        sending, by the mobile device, a second emergency alert notification to one or more additional mobile devices in a predetermined physical proximity to the mobile device.

2. The invention of claim 1, wherein the emergency alert notification includes at least a portion of the encapsulation data.

3. The invention of claim 2, wherein the encapsulation data comprises at least one of: global positioning system (GPS) coordinates, still images, video images, audio recordings, cellular tower data, date and time data, temperature data, and biomedical data.

4. The invention of claim 3, further comprising:
    gathering the biomedical data by one or more biomedical sensors in communication with the mobile device, wherein the biomedical data comprises at least one of EKG data, metabolism data, perspiration data, and hormone level data.

5. The invention of claim 1, further comprising:
    authorizing, by the user of the mobile device, one or more emergency alert groups to receive the emergency alert notification, wherein an emergency alert group comprises at least one of: law enforcement and security authorities, fire departments, hospitals, paramedics, caregivers, family members, coworkers, classmates, and authorized individuals.

6. The invention of claim 1, wherein the step of activating the alert mode of the mobile device comprises:
    manually activating the alert mode of the mobile device by one of: a voice command, a button press, or selection of an icon.

7. The invention of claim 1, wherein the step of activating the alert mode of the mobile device comprises:
    automatically activating, by the mobile device, the alert mode when a peripheral device in communication with the mobile device is removed from a given physical proximity of the mobile device.

8. The invention of claim 7, wherein the peripheral device is a wallet configured to be in wireless communication with the mobile device.

9. The invention of claim 1, wherein the step of activating the alert mode of the mobile device comprises:
    automatically activating the alert mode based on data received from the one or more data sensors of the mobile device.

10. The invention of claim 9, wherein the one or more data sensor comprise a peripheral triggering device in communication with the mobile device.

11. The invention of claim 10, wherein the peripheral triggering device comprises eyeglasses in communication with the mobile device, the method further comprising:
    displaying screen menus of the mobile device in a display area of a lens of the eyeglasses;
    activating a menu based on at least one of: a focal point of the user's eye, movement of the eye, and blinking.

12. The invention of claim 1, wherein the one or more data sensors of the mobile device comprise at least one of: a global positioning system (GPS) transceiver, a camera, and a microphone.

13. The invention of claim 1, wherein the one or more data sensors of the mobile device comprise at least one of a biomedical sensor, a passive infrared sensor, an ultrasonic motion sensor, and a focused laser light sensor.

14. The invention of claim 1, further comprising:
    generating, by the emergency database, an emergency history report based upon cumulative emergency alert notifications from a plurality of mobile devices in communication with the mobile communications network.

15. The invention of claim 14, further comprising:
    accessing, by the mobile device, the emergency database;
    requesting, by the mobile device, an emergency history report for a given location, wherein the location comprises at least one of a given geographic area, a given address, and a given building;
    displaying, on the mobile device, an overlay of emergency history data on a map of the location.

16. The invention of claim 15, further comprising:
    updating the emergency history data in substantially real-time;
    displaying the location of one or more members of emergency alert groups corresponding to the user;
    displaying the locations of one or more emergency responders; and
    displaying the locations of law enforcement offices, hospitals and fire stations.

17. The invention of claim 1, further comprising:
    compiling, by a pre-processor coupled to the emergency database, data from one or more emergency alert signals into a single emergency alert report;

providing the single emergency alert report to an emergency dispatcher.

18. The invention of claim 17, further comprising:
analyzing, by the pre-processor, data from one or more emergency alerts to determine whether each emergency alert is corresponding to a new emergency situation or an emergency situation that is already reported to emergency responders.

19. The invention of claim 18, wherein if data from a given emergency alert corresponds to an emergency situation that is already reported to emergency responders, the data for the emergency alert is provided to the emergency database for storage and subsequent analysis.

20. A system for alerting emergency responders to the existence of an emergency situation, the system comprising:
- a plurality of mobile devices in communication with a mobile communications network, each mobile device comprising an encapsulator for capturing encapsulation data from one or more data sensors of the mobile device, wherein each mobile device is configured to be selectably placed into an alert mode by a user of the mobile device;
- an emergency database in communication with the mobile communications network, the emergency database also in communication with one or more emergency response dispatchers;
- a pre-processor coupled to the emergency database;
- wherein, when one or more of the mobile devices are in the alert mode:
  - each mobile device in the alert mode is configured to send the encapsulation data, in substantially real-time, to the emergency database;
  - the pre-processor of the emergency database is configured to (i) analyze data from one or more emergency alerts to determine whether each emergency alert is corresponding to a new emergency situation or an emergency situation that is already reported to one or more emergency response dispatchers, (ii) compile encapsulation data from each mobile device in the alert mode into a single emergency alert report, and (iii) provide the single emergency alert report to one or more emergency dispatcher;
  - the emergency database is configured to send a first emergency alert notification to one or more emergency alert groups associated with the users of each mobile devices in the alert mode; and
  - each mobile device is further configured to send a second emergency alert notification to one or more additional mobile devices in a predetermined physical proximity to the mobile device.

* * * * *